US012216735B2

(12) United States Patent
Abdelaziz et al.

(10) Patent No.: US 12,216,735 B2
(45) Date of Patent: Feb. 4, 2025

(54) SUPPORTING FLOATING POINT 16 (FP16) IN DOT PRODUCT ARCHITECTURE

(71) Applicant: Samsung Electronics Co., Ltd., Suwon-si (KR)

(72) Inventors: Hamzah Ahmed Ali Abdelaziz, San Jose, CA (US); Ali Shafiee Ardestani, San Jose, CA (US); Joseph H. Hassoun, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1053 days.

(21) Appl. No.: 17/153,871

(22) Filed: Jan. 20, 2021

(65) Prior Publication Data

US 2021/0319079 A1 Oct. 14, 2021

Related U.S. Application Data

(60) Provisional application No. 63/008,544, filed on Apr. 10, 2020.

(51) Int. Cl.
*G06F 17/16* (2006.01)
*G06F 7/544* (2006.01)

(52) U.S. Cl.
CPC ............ *G06F 17/16* (2013.01); *G06F 7/5443* (2013.01)

(58) Field of Classification Search
CPC ........ G06F 7/5443; G06F 7/523; G06F 7/483; G06F 7/487; G06F 7/4873; G06F 17/15;

(Continued)

(56) References Cited

U.S. PATENT DOCUMENTS 10,438,115 B2 10/2019 Henry et al.
2018/0218518 A1* 8/2018 Yan .......................... G06T 9/002
(Continued)

FOREIGN PATENT DOCUMENTS

WO 2020044238 A1 3/2020

OTHER PUBLICATIONS

Hennessy, John L., et al. Computer Architecture : A Quantitative Approach, Elsevier Science & Technology, 2014. ProQuest Ebook Central, http://ebookcentral.proquest.com/lib/uspto-ebooks/detail.action?docID=404052. (Year: 2014).*

*Primary Examiner* — Emily E Larocque
*Assistant Examiner* — Huy Duong
(74) *Attorney, Agent, or Firm* — Renaissance IP Law Group LLP

(57) ABSTRACT

A dot-product architecture and method are disclosed for calculating floating-point dot-products of two vectors. The architecture includes an array of multiplier units that each include an integer logic that multiplies integer values of corresponding elements of the two vectors; an exponent logic that adds exponent values of the corresponding elements of the two vectors to form an unbiased exponent values, and a local shifter that forms a first shifted value by shifting a product-integer value by a number of bits in a predetermined direction based on a difference value between an unbiased exponent value corresponding to the product-integer value and a maximum unbiased exponent value for the array of multiplier units. An adder tree adds shifted values output from local shifters of the array of multiplier units to form an output, and an accumulator accumulates the output of the addition unit.

19 Claims, 8 Drawing Sheets

(58) Field of Classification Search
CPC . G06F 17/16; G06F 5/01; G06F 5/012; G06F 9/3885; G06F 9/3887; G06F 9/3893; G06F 9/30079; G06F 9/3001; G06F 17/153
See application file for complete search history.

(56) References Cited

U.S. PATENT DOCUMENTS

| | | |
|---|---|---|
| 2019/0042193 A1* | 2/2019 | Pasca .................. G06F 7/4876 |
| 2019/0042544 A1 | 2/2019 | Kashyap et al. |
| 2019/0155574 A1 | 5/2019 | Langhammer et al. |
| 2019/0294415 A1 | 9/2019 | Kaul et al. |
| 2019/0340489 A1 | 11/2019 | Mills |
| 2019/0369988 A1 | 12/2019 | Kaul et al. |
| 2020/0193274 A1 | 6/2020 | Darvish Rouhani et al. |
| 2020/0265545 A1 | 8/2020 | Mellempudi et al. |
| 2020/0272416 A1 | 8/2020 | Ramesh et al. |
| 2021/0263993 A1* | 8/2021 | Urbanski .............. G06F 7/5443 |
| 2023/0297337 A1* | 9/2023 | Mohamed Awad ... G06N 3/082 708/501 |
| 2023/0376274 A1* | 11/2023 | Anders ................ G06F 7/5443 |

* cited by examiner

| Type | (sgn, exp, man) | Value |
|---|---|---|
| zero | (sgn, 0...0, 0...0) | zero |
| INF | (sgn, 1..1, 0...0) | ± infinity |
| NaN | (sgn, 1..1, man) | $man \neq 0$, Not-a-Number |
| Normal | (sgn, exp, man) | $(-1)^s \times 2^{exp\text{-}bias} \times 1.man$ |
| subnormal | (sgn, 0...0man) | $(-1)^s \times x^{-bias+1} \times 0.man$ |

SUPPORTING FLOATING POINT 16 (FP16) IN DOT PRODUCT ARCHITECTURE

CROSS-REFERENCE TO RELATED APPLICATION

This application claims the priority benefit under 35 U.S.C. § 119(e) of U.S. Provisional Application No. 63/008,544, filed on Apr. 10, 2020, the disclosure of which is incorporated herein by reference in its entirety.

TECHNICAL FIELD

The subject matter disclosed herein relates to computing units. More particularly, the subject matter disclosed herein relates to a computing-unit architecture and a method for computing floating-point dot products.

BACKGROUND

A dot product of an activation value and a weight value is an operation that deep neural network (DNN) accelerators commonly compute. The activation and weight values may be represented by 16-bit half-precision floating-point (FP16) values. An FP16 value may be represented by a sign, an exponent and a fraction bit. As an example, FIG. 1A depicts a half-precision FP16 representation that includes 1 sign bit, 5 exponent bits, (bias=15), and 10 mantissa bits (with 1 hidden bit). FIG. 1B shows a table setting forth example representations for different types of FP numbers. The representations in FIG. 1B are for an exponent not equal to 0 or infinity (1 . . . 1), and for a bias of 15(127) for FP 16. The acronym NAN means Not a Number.

SUMMARY

An example embodiment provides a device for calculating dot-products of a first vector and a second vector in which the device may include an array of multiplier units, a max tree unit, an adder tree, and an accumulator. The first vector may be an activation value and the second vector may be a weight value. A multiplier unit of the array of multiplier units may include integer logic, exponent logic and a local shifter. The integer logic may multiply integer values of corresponding elements of the first vector and the second vector to form a product-integer value in which the first vector and the second vector may include floating-point values. The exponent logic may add exponent values corresponding to the integer values of the corresponding elements of the two vectors to form an unbiased exponent value corresponding to the product-integer value. The local shifter may form a first shifted value by shifting the product-integer value by a number of bits in a predetermined direction based on a difference value between the unbiased exponent value corresponding to the product-integer value and a maximum unbiased exponent value for the array of multiplier units being less than or equal to a predetermined maximum bit-shift capacity of the local shifter. The max tree unit may determine the maximum unbiased exponent value for the array of multiplier units. The adder tree may add first shifted values output from local shifters of the array of multiplier units to form a first output, and the accumulator may accumulate the first output of the adder tree. In one embodiment, the device may further include a mask generator that may generate a first mask that couples the first shifted value to the adder tree based on the difference value between the unbiased exponent value corresponding to the product-integer value and the maximum unbiased exponent value being less than or equal to the predetermined maximum bit-shift capacity of the local shifter corresponding to the first shifted value, and in which the adder tree may add the first shifted values output from local shifters of the array of multiplier units and that are coupled to the adder tree by the first mask to form the first output. The mask generator may generates the first mask during a first cycle. In another embodiment, the mask generator may generate a second mask that couples the first shifted value to the adder tree based on the difference value between the unbiased exponent value corresponding to the product-integer value and the maximum unbiased exponent value being greater than the predetermined maximum bit-shift capacity of the local shifter corresponding to the first shifted value, and in which the adder tree may add the first shifted values output from local shifters of the array of multiplier units and that are coupled to the adder tree by the second mask to form a second output. The device may further include an auxiliary shifter coupled to the adder tree and that may forming a second shifted value by shifting the second output from the adder tree by the predetermined maximum bit-shift capacity of the local shifter, and the accumulator may further accumulate the second output of the adder tree. The mask generator may generate the second mask during a second cycle. In one embodiment, the activation value and the weight value may include 16-bit floating-point (FP16) values. In another embodiment, the activation value and the weight value may be 32-bit floating-point (FP32) values.

An example embodiment provides a multiplier unit that may include integer logic, exponent logic and a local shifter. The integer logic may multiply integer values of elements of a first vector and corresponding elements of a second vector to form a product-integer value. The first vector may be an activation value and the second vector may be a weight value. The exponent logic may add exponent values corresponding to the integer values of the corresponding elements of the two vectors to form an unbiased exponent value corresponding to the product-integer value. The local shifter may form a first shifted value by shifting the product-integer value by a number of bits in a predetermined direction based on a difference value between the unbiased exponent value corresponding to the product-integer value and a predetermined value being less than or equal to a predetermined maximum bit-shift capacity of the local shifter. The multiplier unit may be part of an array of multiplier units along with a max tree unit, an adder tree, and an accumulator. The max tree unit may determine the predetermined value in which the predetermined value may include a maximum unbiased exponent value for the array of multiplier units. The adder tree may add first shifted values output from local shifters of the array of multiplier units to form a first output. The accumulator may accumulate the first output of the adder tree. A mask generator may generates a first mask that couples the first shifted value to the adder tree based on the difference value between the unbiased exponent value corresponding to the product-integer value and the maximum unbiased exponent value being less than or equal to the predetermined maximum bit-shift capacity of the local shifter corresponding to the first shifted value. The adder tree may add the first shifted values output from local shifters of the array of multiplier units and that are coupled to the adder tree by the first mask to form the first output. The mask generator may generate the first mask during a first cycle. The mask generator may generate a second mask that couples the first shifted value to the adder tree based on the difference value between the unbiased exponent value corresponding to the product-integer value and the maximum unbiased exponent value being greater than the predetermined maximum bit-shift capacity of the local shifter corresponding to the first shifted value. The mask generator may generate the second mask during a second cycle. The adder tree may add the first shifted values output from local shifters of the array of multiplier units and that are coupled to the adder tree by the second mask to form a second output. The array of multiplier units may further include an auxiliary shifter coupled to the adder tree and that forms a second shifted value by shifting the second output from the adder tree by the predetermined maximum bit-shift capacity of the local shifter, and the accumulator may further accumulate the second output of the adder tree. In one embodiment, the activation value and the weight value may be 16-bit floating-point (FP16) values. In another embodiment, the activation value and the weight value may be 32-bit floating-point (FP32) values.

An example embodiment provides a method to compute dot-products for floating point values in which the method may include: element-wise multiplying, by integer logic an array of multiplier units, integer values of elements of a first vector by integer values of corresponding elements of a second vector to form integer-product values in which the first vector may include n elements of 16-bit floating point values and the second vector may include n elements of 16-floating point values in which n is an integer greater than 1; element-wise adding, by exponent logic of the array of multiplier units, exponent values of the elements of the first vector and exponent values of the corresponding elements of the second vector to form exponent sum values that respectively correspond to the integer-product values; determining a maximum exponent sum value of the exponent sum values; subtracting, by the exponent logic, the maximum exponent sum value from each of the exponent sum values to form relative exponent values that respectively correspond to the integer-product values; right-bit shifting, by first local shifters of the array of multiplier units, first integer-product values by a corresponding relative exponent value to form integer-product values that are aligned with an integer-product value corresponding to the maximum exponent sum value, each first local shifter comprising a first predetermined maximum number of bit shifts that is less than a full bit range of exponent sum values of the first vector and of the second vector, and the first integer-product values corresponding to relative exponent values that are less than or equal to the first predetermined maximum number of bits shifts; and adding the first integer-product values that are aligned with the integer-product value corresponding to the maximum exponent sum value to form a dot product of the first vector and the second vector. In one embodiment, the method may further include right-bit shifting, by an auxiliary shifter, second integer-product values by a second predetermined number of bit shifts to form second integer-product values that are aligned with the integer-product value corresponding to the maximum exponent sum value in which the second predetermined number of bit shifts may include the first predetermined maximum number of bits shifts. A full bit range of exponent values of the first vector and of the second vector may include 58 bits, and the first predetermined maximum number of bit shifts plus the second predetermined number of bits shifts may be less than or equal to 58 bits. In one embodiment, elements of first vector and elements of the second vector may include 16-bit floating point (FP16) values. In another embodiment, elements of first vector and elements of the second vector may include 32-bit floating point (FP32) values.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figures 1A, 1B:
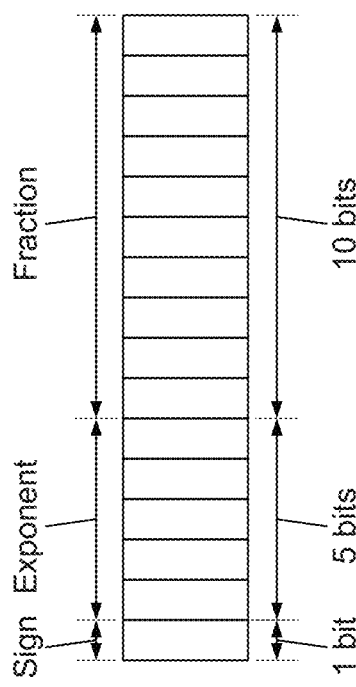
FIG. 1A depicts a half-precision FP16 representation that includes a sign bit, exponent bits, and mantissa bits.
FIG. 1B is a table setting forth example representations for different types of FP numbers.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein provides an architecture for calculating dot products of floating-point values of deep-learning data that is optimized in area and power for commonly encountered cases. The optimization of the architecture may be based on the distribution of the range of exponent values expected to be processed. Depending upon the distribution of the range of exponents, the architecture may be optimized to align mantissas and calculate a dot product in one cycle. In other embodiments, the architecture may be optimized to align mantissas and calculate a dot product in two or in three cycles. In one embodiment, the floating-point values may be FP16 values. In another embodiment, the floating-point values may be FP32 values or may be bfloat16 values. The area-optimized aspect of the architecture may be embodied by a relatively smaller space than the space that would be used by an architecture that covers a full range of exponent values associated with a particular floating-point format.

In some cases, alignment of mantissas of relatively small floating-point values with relatively large floating-point values may be ignored or approximated by truncation without significant performance degradation because addition of a relatively small floating-point value with a large floating-point value will not significantly adversely affect a dot-product calculation. In one embodiment, the range of alignment capability of the architecture disclosed herein may be less than the range of exponent values expected to be processed and relatively small floating-point values may be ignored or partially truncated and still provide sufficiently accurate results. In the case of partially truncating, correct alignment should still occur, but only a portion of the aligned product is added with other values.

DNN accelerators commonly compute dot products of FP16 activation value and corresponding FP16 weight values. Considering normalized FP16 numbers only, $X=[x_0, \ldots, x_{n-1}]^T$ may be defined as a vector of activation FP16 values, and $W=[w_0, \ldots, w_{n-1}]^T$ may be defined as a vector of weight FP16 values. A dot product computation of FP16 values involves an element-wise multiplication of signed mantissas of two vectors and addition of the exponents to calculate product exponents. For example, the dot product p of X and W may be determined as:

$$p = X \cdot W =$$

$$\sum_i w_i x_i = \sum_i \left[-1^{s_{w_i}} \times 2^{e_{w_i}-15} \times 1 \cdot m_{w_i}\right]\left[-1^{s_{x_i}} \times 2^{e_{x_i}-15} \times 1 \cdot m_{x_i}\right] =$$

$$\sum_i (-1^{s_i}) \times (2^{e_i}) \times (1 \cdot m_i)$$

in which i is an index, $s_{w_i}$ is the sign of the weight value i, $e_{w_i}$ is the exponent of the weight value $m_{w_i}$ is the mantissa value of the weight value i, $s_{x_i}$ is the sign of the activation value i, $e_{x_i}$ is the exponent of the activation value i, $m_{x_i}$ is the mantissa value of the activation value, $s_i$ is the sign of the product value i, $e_i$ is the exponent of the product value i, and $m_i$ is the mantissa of the product value].

Figure 2:
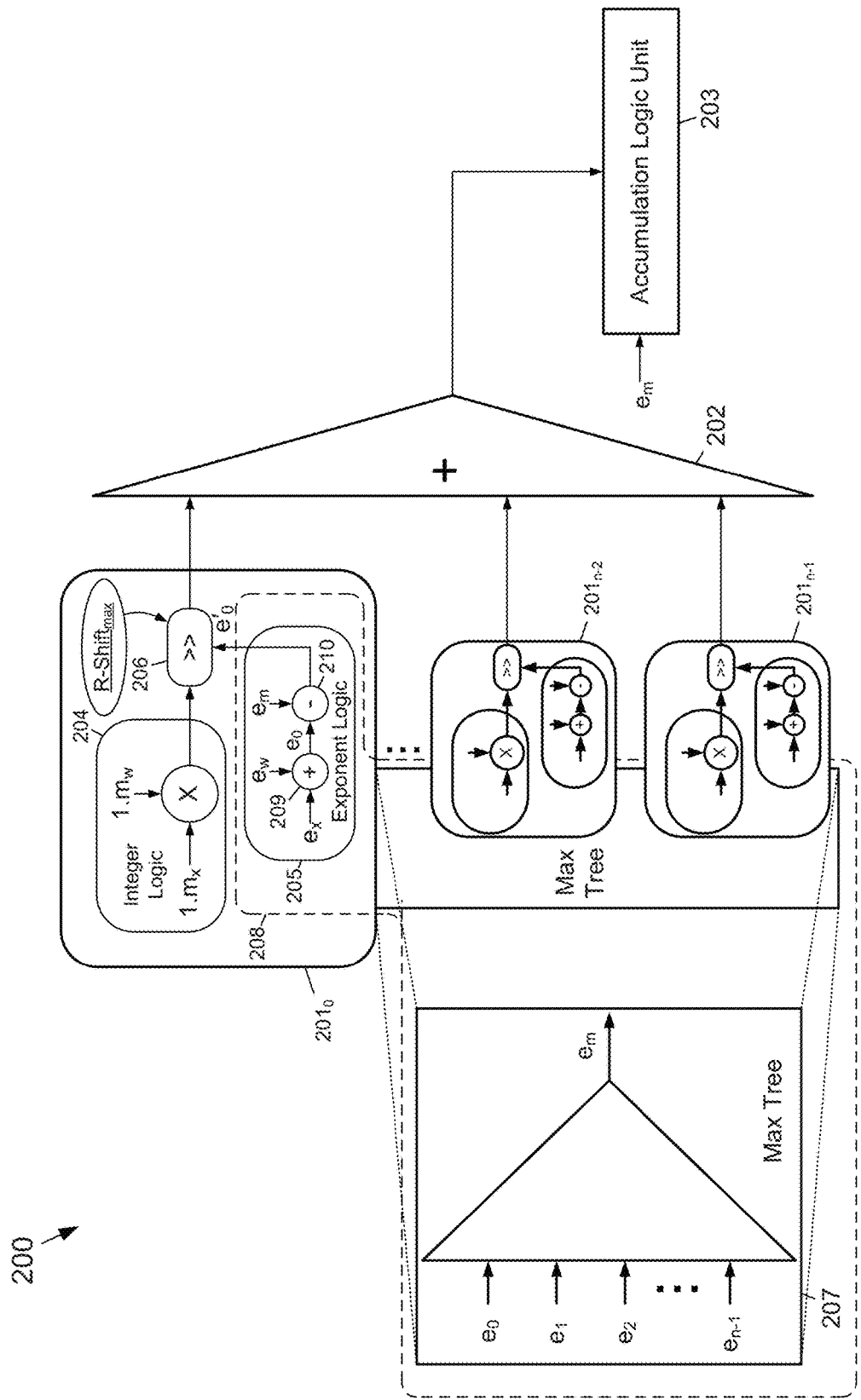
FIG. 2 depicts an example of first embodiment of a dot-product computation architecture 200 that aligns the exponents of mantissa products so that the mantissas may be added while also being optimized for area and power according to the subject matter disclosed herein.

The products (mantissas) in a FP16 dot-product calculation may be added if the exponents of the products are aligned (typically) with the exponent having the maximum value. FIG. 2 depicts an example of first embodiment of a dot-product computation architecture 200 that aligns the exponents of mantissa products so that the mantissas may be added while also being optimized for area and power according to the subject matter disclosed herein. In one embodiment, the architecture 200 may include an array of multiplier units $201_0$-$201_{n-1}$ (in which n is an integer), an addition unit (i.e., an adder tree) 202, and an accumulation unit 203. A max-tree logic unit 207 may be coupled to the exponent logic section 205 of each of the multiplier units 201. A multiplier unit 201 may be configured as a module that may include hardware configured to provide the functionality described herein in connection with a multiplier unit 201.

Each multiplier unit 201 includes an integer (mantissa) logic section 204, an exponent logic section 205, and a shifter 206. The integer logic section 204, the exponent logic section 205 and the shifter 206 may be formed from discrete components, such as transistors, interconnecting conductors, biasing components and/or discrete logic components. Each multiplier unit 201 receives mantissas and exponents for elements of an X input vector and corresponding elements of a W input vector. In one embodiment, the X vector may include elements that are activation values, and the W vector may include elements that are weight values. The integer logic section 204 receives values for, for example, an activation value $1.m_x$ and a corresponding weight value $1.m_w$, and multiplies the two mantissa values to form a product mantissa. The product mantissa value is output to the shifter 206. Although the example activation and corresponding weight values are given as normalized numbers, subnormal values ($0.m_x$ and/or $0.m_w$) are also supported by the multiplier units 201.

Alignment of the mantissas may be accomplished by the shifter 206 shifting a product-mantissa value by a difference between its exponent value and a maximum exponent value of the product-mantissa values in the array of multipliers 201. For FP16, the range of exponents for products is [−28, 30], so at an extreme, alignment shifting for FP16 may be up to 58 bits, in which case alignment overhead for a dot-product computation architecture to cover a full range of FP16 exponents may be significant (up to 58 bits) and the addition logic may involve, for example, an 80-bit adder tree.

The distribution of differences between exponent values and a maximum exponent value for FP16 data that is associated with deep learning typically does not cover the full 58-bit exponent value range for FP16. Instead, the distribution of the differences between exponent values and a maximum exponent value commonly tends to cover a much smaller range of values. For example, FIG. 3A shows a distribution histogram of example maximum exponent values for deep-learning FP16 data. FIG. 3B shows a distribution histogram of example maximum minus exponent values for deep-learning FP16 data. Lastly, FIG. 3C shows a distribution histogram of example product-exponent values for deep-learning FP16 data.

Figure 3C:
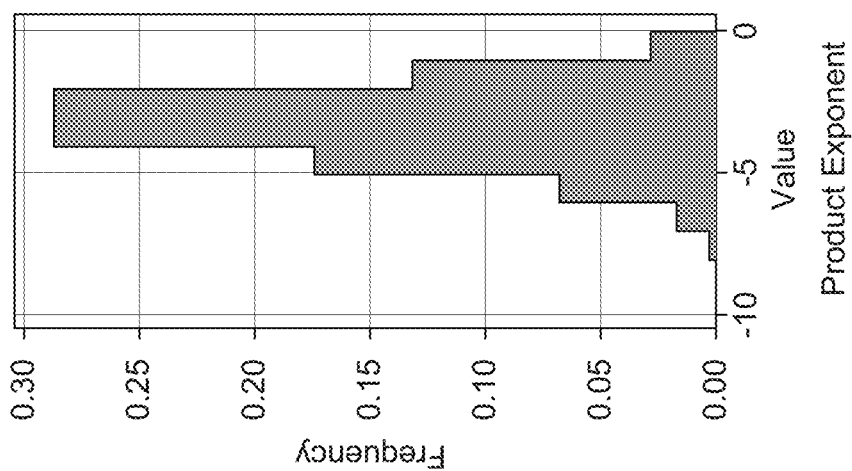
FIG. 3C shows a distribution histogram of example product exponent values for deep-learning FP16 data.
Figure 3B:
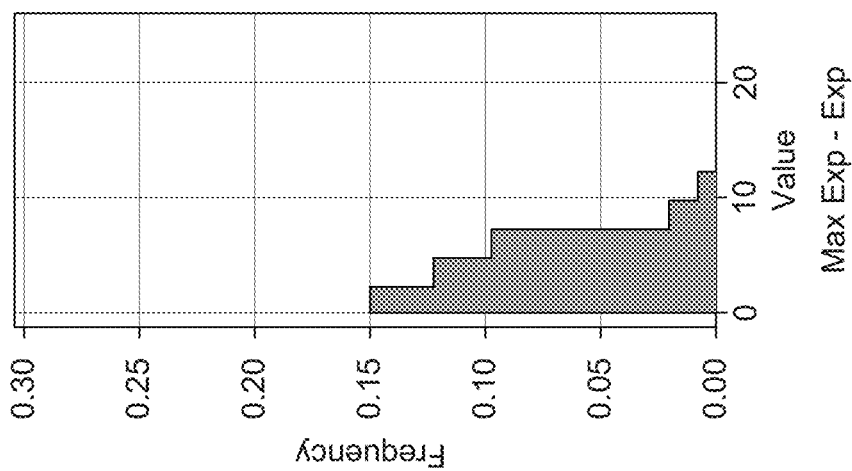
FIG. 3B shows a distribution histogram of example maximum minus exponent values for deep-learning FP16 data.
Figure 3A:
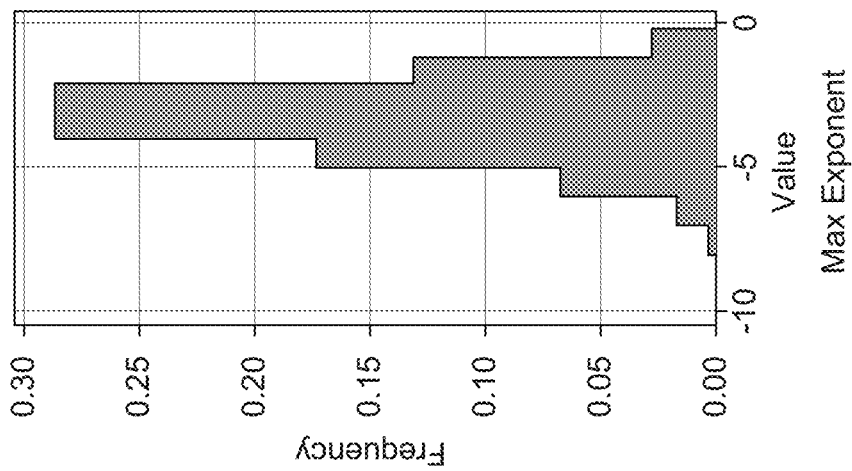
FIG. 3A shows a distribution histogram of example maximum exponent values for deep-learning FP16 data.

The relatively limited range of the bell-type distribution of the deep-learning FP16 data shown in FIGS. 3A-3C may be used by the subject matter disclosed herein to provide a dot-product architecture that may be optimized in area and power for commonly encountered cases for calculating FP16 operations for deep-learning data. In particular, the characteristics of the deep-learning FP16 data shown in FIGS. 3A-3C may be used to provide a dot-product architecture having a right-shift capability that is far less that the 58-bit shift that would be needed to accommodate the full range of exponent values for normalized FP16 data.

Returning to FIG. 2, the exponent logic section 205 adds the exponents of the corresponding elements of the X and W vectors as part of a multiplication operation provided by a multiplier unit 201. The exponent logic unit 205 may include a first adder 209 and a second adder 210. The first adder 209 determines an unbiased exponent value e based on a summation of an FP16 activation exponent value $e_x$ and a corresponding FP16 weight exponent value $e_w$. The second adder 210 subtracts the maximum exponent value $e_m$ from the unbiased exponent value e to form a relative exponent value e'. The maximum exponent value $e_m$ may be determined by the max tree 207. The relative exponent value e' may be used to control the amount of right shift applied to a mantissa-product value by the shifter 206.

Together, the exponent logic units 205 of each of the multiplier units 201 and the max-tree logic unit 207 may form an exponent handling unit 208 for the architecture 200. The max-tree logic unit 207 determines a maximum exponent value $e_m$. The max-tree logic unit 207 is coupled to each multiplier logic unit $201_a$-$201_n$ and receives each of the unbiased exponent values e from the exponent logic units 205 of the array. The max-tree logic unit 207 determines the maximum exponent value $e_m$ of the received unbiased exponent values e, and outputs the maximum exponent value $e_m$ to an input of the second adder 210 in each exponent logic unit 205.

The shifter 206 may be configured to right bit shift a mantissa-product value up to a maximum of right bit shift R-Shift$_{max}$ in which R-Shift$_{max}$ may be selected based on a distribution of the range of exponent values of deep learning FP16 data that is expected to be processed by the dot-product computation architecture 200. (In a situation in which an exponent value is encountered that greater than the R-Shift$_{max}$, a multi-cycle technique described below may be used to align product values.) The relative exponent value e' output from the exponent logic unit 205 is used to control the number of right bit shifts provided by the shifter 206 for a given dot-product computation. In one example embodiment, R-Shift$_{max}$ may be selected to be 8-bits to account for an example range of exponent values of a deep-learning FP16 data that is to be processed by the architecture 200. By limiting the shifter 206 to, for example, 8-bits, the optimized dot-product architecture 200 may provide dot-product calculation operations that have been optimized in area and power. It should be understood that R-Shift$_{max}$ may be selected to be any integer value.

The aligned product values output from the respective shifters 206 are input to the addition unit 202 and added. The output of the addition unit 202 is accumulated in the accumulation logic unit 203. The maximum exponent value $e_m$ is also input to the accumulation logic unit 203 because the exponent of the summation of the adder tree 202 is the maximum exponent value $e_m$. The summation is then added (i.e., accumulated in accumulation logic 203) with a value stored in the accumulation logic unit 203. For example, consider that the accumulation logic unit 203 is storing a previous summation. The summation is a floating number with integer value (adder tree output) and exponent value (max exponent). The next summation may have a different exponent (i.e., another maximum exponent value $e_m$). The maximum exponent value $e_m$ is input to the accumulation logic unit 203 to align/add the value stored in the accumulator with the new summation value from the adder tree.

Figure 4A:
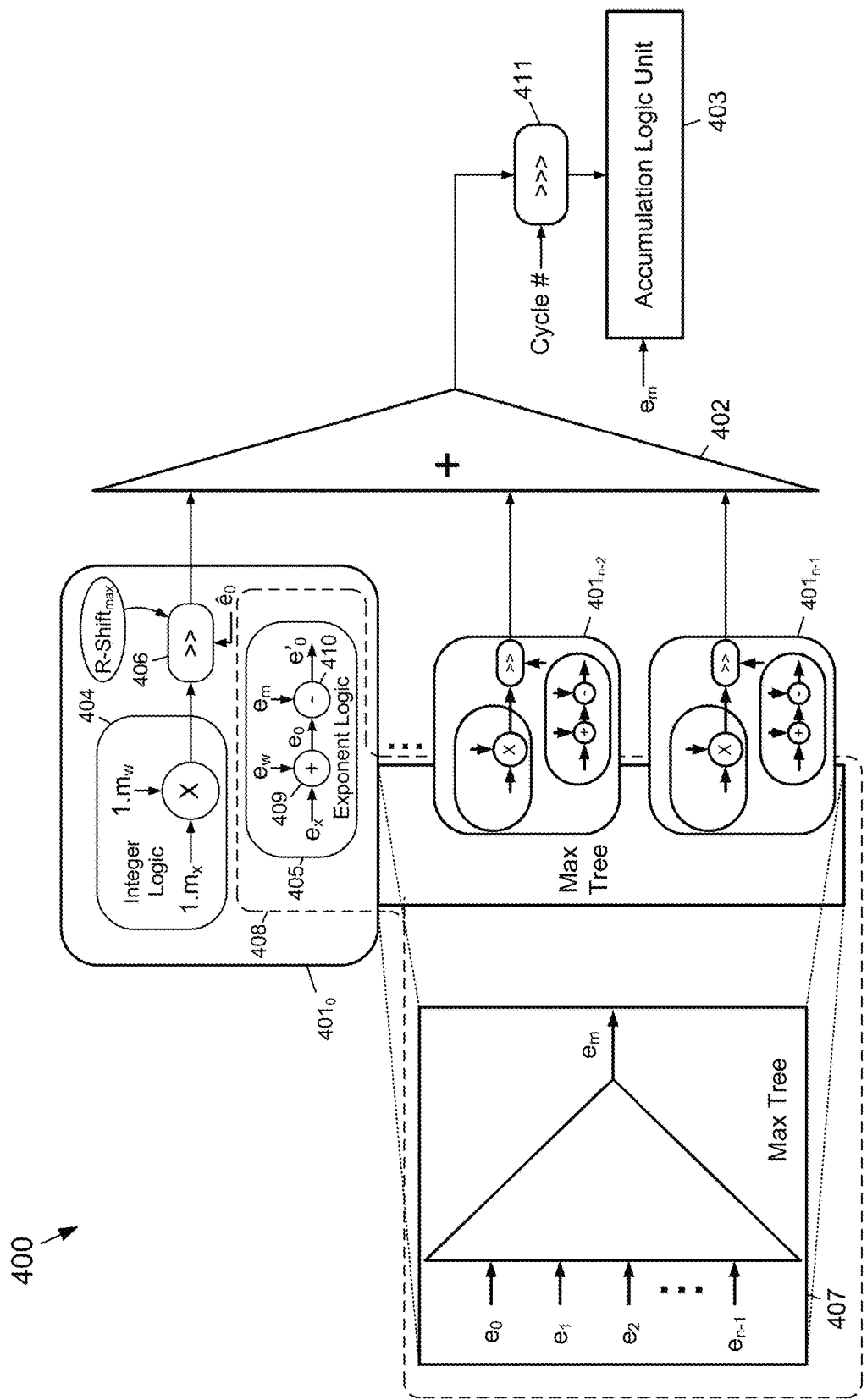
FIGS. 4A and 4B depict an example embodiment of a dot-product computation architecture that may be optimized for calculating dot products for deep-learning networks according to the subject matter disclosed herein.
Figure 4B:
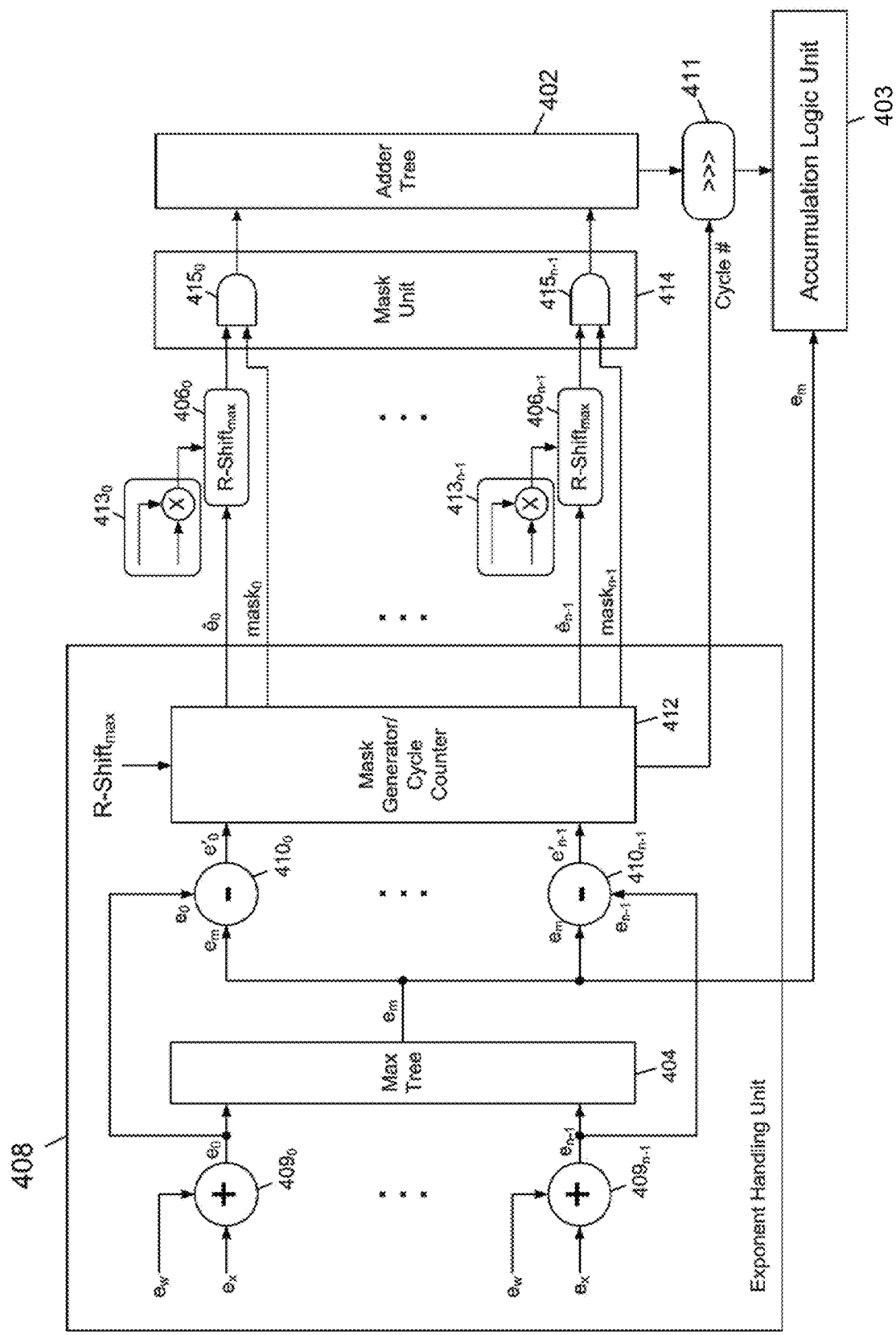

FIGS. 4A and 4B depict an example second embodiment of a dot-product computation architecture 400 that aligns the exponents of mantissa products using a multi-cycle technique so that the mantissas may be added while also being optimized for area and power according to the subject matter disclosed herein. The architecture 400 may include an array of multiplier units $401_0$-$401_{n-1}$ (in which n is an integer), an addition unit (i.e., an adder tree) 402, an auxiliary shifter 411, and an accumulation logic unit 403. A max-tree logic unit 407 may be coupled to the exponent logic section 405 of each of the multiplier units 401. A multiplier unit 401 may be configured as a module that may include hardware configured to provide the functionality described herein in connection with a multiplier unit 401.

Each multiplier unit 401 may include an integer logic unit 404, an exponent logic unit 405, and a local shifter 406. The integer logic section 404, the exponent logic section 405 and the shifter 406 may be formed from discrete components, such as transistors, interconnecting conductors, biasing components and/or discrete logic components. Each multiplier unit 401 receives mantissas and exponents for elements of an X input vector and corresponding elements of a W input vector. The integer logic section 404 receives values for, for example, an activation value 1.$m_x$ and a corresponding weight value 1.$m_w$, and multiplies the two mantissa values to form a product-mantissa value. The product-mantissa value is output to the local shifter 406. A sign multiplier 413$_i$ also inputs a sign signal into a local shifter 406. Similar to FIG. 2, the example activation and corresponding weight values in FIG. 4 are given as normalized numbers, and subnormal values (0.$m_x$ and/or 0.$m_w$) are also supported by the multiplier units 401. The product-mantissa value is output to the local shifter 409.

The exponent logic unit 405 may include a first adder 409 and a second adder 410. The first adder 409 determines an unbiased exponent value e based on the summation of an FP16 activation exponent value $e_x$ and a corresponding FP16 weight exponent value $e_w$. The second adder 410 subtracts a maximum exponent value $e_m$ from the unbiased exponent value e to form a relative exponent value e'. The maximum exponent value $e_m$ may be determined by the max tree 407. The relative exponent value e' is used to generate a local shift amount ê that controls the amount of right shift applied to a mantissa product by the local shifter 406.

The local shifter 406 is configured to right bit shift a mantissa-product value up to a maximum of right bit shift R-Shift$_{max}$ in which R-Shift$_{max}$ may be selected based on a distribution of the range of exponent values of deep learning FP16 data that is expected to be processed by the dot-product computation architecture 400. The architecture 400 is capable of handling situations in which an exponent value is encountered that greater than the R-Shift$_{max}$ by using a multi-cycle technique to align product values. In one example embodiment, R-Shift$_{max}$ may be selected to be 8-bits to account for an example distribution of range of exponent values of a deep-learning FP16 data that is to be processed by the architecture 400. It should be understood that R-Shift$_{max}$ may be selected to be any integer value.

Together, the exponent logic units 405 of each of the multiplier units 401 and the max-tree logic unit 407 may form an exponent handling unit 408 for the architecture 400. The max-tree logic unit 407 determines a maximum exponent value $e_m$. The max-tree logic unit 407 is coupled to each multiplier logic unit 401$_a$-401$_n$ and receives each of the unbiased exponent values e from the exponent logic units 405 of the array. The max-tree logic unit 407 determines the maximum exponent value $e_m$ of the received unbiased exponent values e, and outputs the maximum exponent value $e_m$ to an input of the second adder 410 in each exponent logic unit 405.

The aligned mantissa-product values output from the respective local shifters 406 are input to the addition unit 402 and added. The output of the addition unit 402 is accumulated in the accumulation logic unit 403 after any additional shifting that may be provided by the auxiliary shifter 411 in a multi-cycle technique, as described below. The auxiliary shifter 411 provides an increased range of exponent differences values that may be encountered by the architecture 400 while also keeping the physical area dedicated to shifting exponent values relatively small in comparison to, for example, a 58-bit shifter that would cover the full range of exponents for FP16 values. For example, if the local shifters 406 and the auxiliary shifter 411 are 8-bit shifters, the total physical area dedicated to shifters for the architecture 400 will be n times the area of an 8-bit local shifters 406 plus the area for one 8 bit auxiliary shifter 411, which equals (n+1)×(area of an 8 bit shifter). In contrast, the area dedicated to shifters for the architecture 100 is n×(area of a 58-bit shifter). It should be understood that the auxiliary shifter 411 is not limited to be an 8-bit shifter, and can be a shifter of any bit-shifting size. For example, in one embodiment, the auxiliary shifter 411 may be a 32-bit shifter.

The output of the auxiliary shifter 411 is accumulated in the accumulation logic unit 403. The maximum exponent value $e_m$ is also input to the accumulation logic unit 403 because the exponent of the summation of the adder tree 402 and output from the auxiliary shifter 411 is the maximum exponent value $e_m$. The summation is then added (i.e., accumulated in accumulation logic 403) with a value stored in the accumulation logic unit 403. For example, consider that the accumulation logic unit 403 is storing a previous summation. The summation is a floating number with integer value (adder tree output) and exponent value (max exponent). The next summation may have a different exponent (i.e., another maximum exponent value $e_m$). The maximum exponent value $e_m$ is input to the accumulation logic unit 403 to align/add the value stored in the accumulator with the new summation value from the adder tree.

FIG. 4B depicts additional details of the second embodiment of the dot-product computation architecture 400 that are not depicted in FIG. 4A. More specifically, FIG. 4B details of an example embodiment of an exponent handling unit (EHU) 408 and a mask unit 414 according to the subject matter disclosed herein. As depicted in FIG. 4B, the EHU 408 includes a mask generator/cycle counter 412 that is coupled to the maximum exponent value $e_m$ and each relative exponent value e' output. The mask generator/cycle counter 412 uses the maximum exponent value $e_m$ and each relative exponent value e' output to determine a mask and a local shift amount ê for each product. The mask generator/cycle counter 412 also generates a cycle # signal. The mask unit 414 may include n AND gates $415_0$-$415_n$. The mask unit 414 receives the $mask_i$ signals output from the mask generator/cycle counter 412.

In operation, during a cycle #k, products having a relative exponent value e' in the range between k×R-$Shift_{max}$ and (k+1)×R-$Shift_{max}$ will be aligned, and the mask generator/cycle counter 412 outputs a $mask_i$ signal having a value of 1 for those products. The $mask_i$ signal is input to one input of an AND gate $415_i$. Products having a relative exponent value e' that are not in the range between k×R-$Shift_{max}$ and (k+1)×R-$Shift_{max}$ during cycle #k are masked out of the dot-product calculation that cycle, and the mask generator/cycle counter 412 outputs a $mask_i$ signal having a value of 0 for those products. The shift amount ê for the unmasked products is determined by the mask generator/cycle counter 412 to be ê=e'-k×R-$Shift_{max}$. The value of the cycle #k is used to shift the remaining k×R-$Shift_{max}$ by the auxiliary shifter 411.

In one embodiment, a mask signal may be generated to mask out floating-point values that are very small because addition of a relatively small floating-point value with a large floating-point value will not significantly adversely affect a dot-product calculation.

Figure 5A:
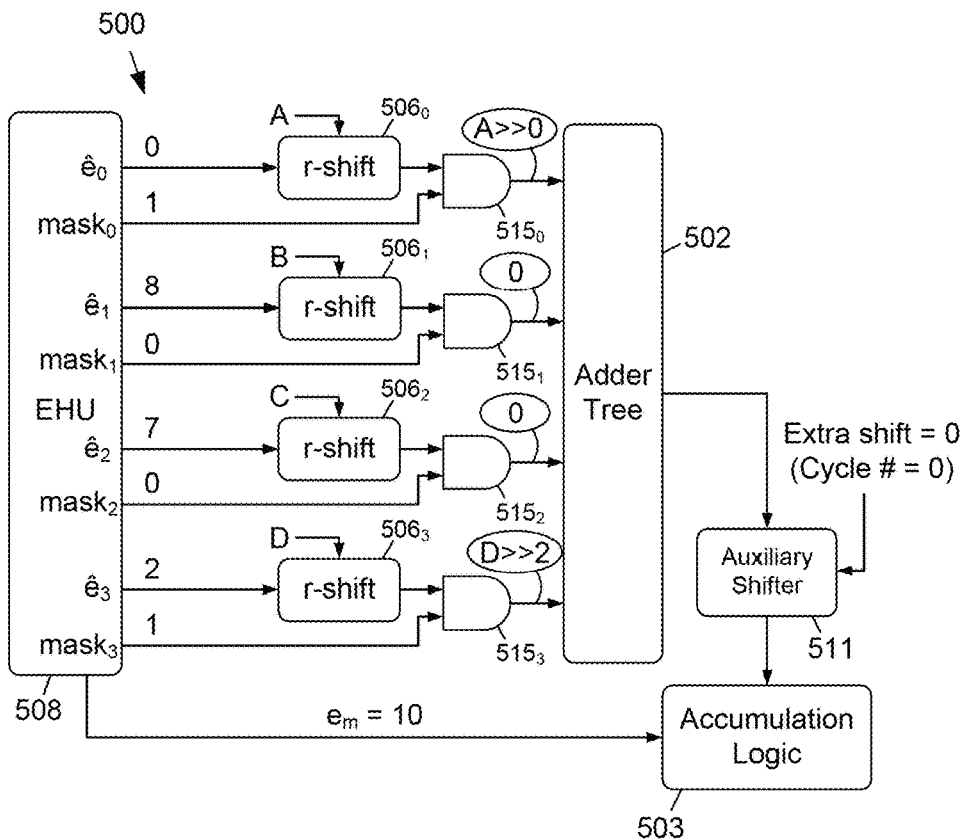
FIGS. 5A and 5B depict additional details of another example embodiment a dot-product computation architecture that provides a multi-cycle operation according to the subject matter disclosed herein.
Figure 5B:
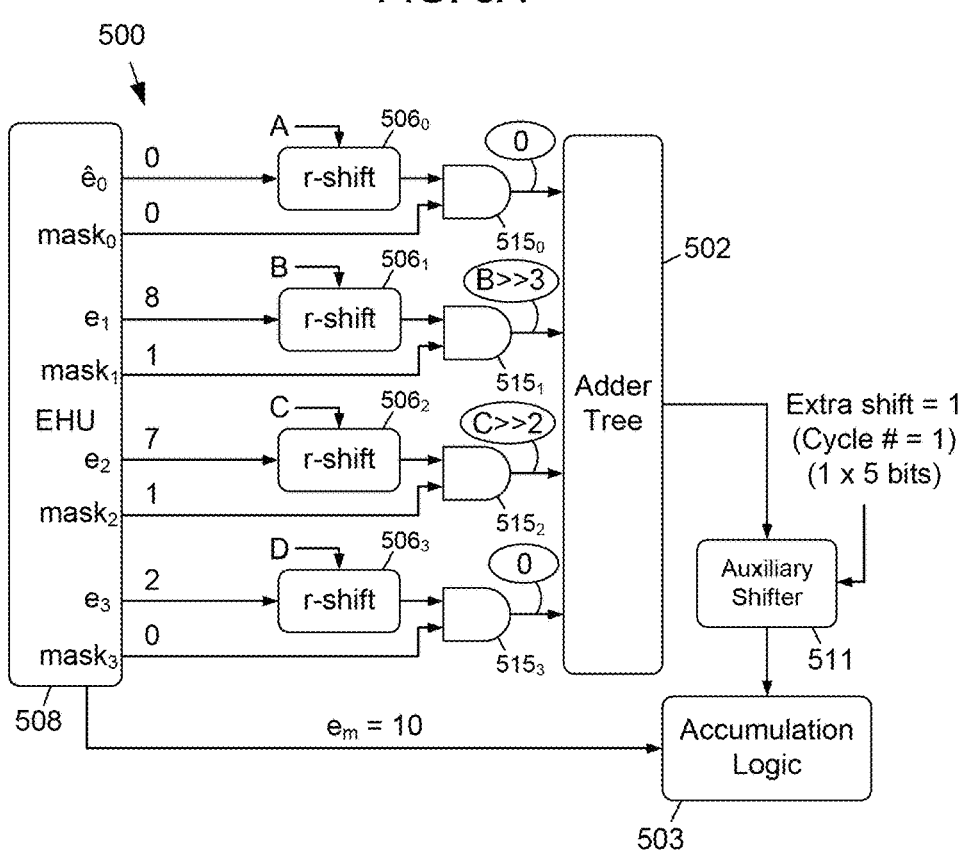

FIGS. 5A and 5B depict an example of a two-cycle alignment process for an example dot-product computation architecture 500 that processes a pair of four-element vectors according to the subject matter disclosed herein. Although the architecture 500 is depicted as processing a pair of four-element vectors, it should be understood that operational details described in connection with FIGS. 5A and 5B are generally the same regardless of the number of vector elements being processed by the architecture 500.

The architecture 500 includes four multiplier units (not shown), an adder tree 502, an accumulation logic unit 503, an exponent handling unit (EHU) 508, and an auxiliary shifter 511. A mask unit is not explicitly depicted in FIGS. 5A and 5B. Each multiplier unit may include a local shifter 506 and an AND gate 515. For this example, the local shifters 506 and the auxiliary shifter 511 may be configured to have a R-$Shift_{max}$ equal to 5 bits. The EHU 508 may include adders, a max tree, and a mask generator/cycle counter similar to that shown for EHU 408 in FIG. 4B.

Referring to FIGS. 5A and 5B, consider a situation in which the four multiplier units generate example products A, B, C and D that respectively have exponents 10, 2, 3 and 8. The products A-D are respectively input to local shifters $506_0$-$506_3$. During a first cycle (i.e., cycle #0) depicted in FIG. 5A, the max tree of the EHU 508 determines that the exponent value of 10 of the product A is the maximum exponent $e_m$. The relative exponents e' for the four products are respectively 0, 8, 7 and 2. That is, for the product A, the relative exponent $e'_A$ is: $e_A-e_m=10-10=0$. For the product B, the relative exponent $e'_B$ is: $e_B-e_m=2-10=-8$. For the product C, the relative exponent $e'_C$ is: $e_C-e_m=3-10=-7$, and for the product D the relative exponent $e'_D$ is: $e_D-e_m=8-10=-2$. The computed signs for the relative exponents are negative because the exponents are being aligned with $e_m$, and the shift direction for the mantissa is always to the right. The absolute values of the relative exponents e' are input to the respective local shifters 506.

Still during the first cycle, mask signals $mask_0$-$mask_3$ are generated by the mask generator 508 based on the relative exponent value e' for a given product. The mask signals $mask_0$-$mask_3$ are applied to an input of a respective AND gate $515_0$-$515_3$. If a relative exponent e' has an absolute value that is greater than the R-$Shift_{max}$ of the local shifter 506, a mask signal value of 0 is generated. If a relative exponent e' has an absolute value that is less than or equal to the R-$Shift_{max}$ the local shifters 506, a mask signal value of 1 is generated. In this example, the local shifters 506 have a maximum shift capability of 5, and the exponent values of the products A and D are within 5-bit shifts (0- and 2-bit shifts, respectively). Mask signal values of 1 will be generated by the mask generator 508 for these two products. The exponent values of the products B and C both exceed 5-bit shifts (8- and 7-bit shifts, respectively), so mask signal values of 0 will be generated by the mask generator/cycle counter 508 for the products B and C.

The mask signal values for the A and D products allow the outputs of the local shifters $506_0$ (output A>>0) and $506_3$ (output D>>2) to be output to the adder tree 502. No extra shifting is needed by the auxiliary shifter 511 for alignment.

During a second cycle (i.e., cycle #1) depicted in FIG. 5B, the EHU 508 determines that the two remaining products B and C may be processed using the local shifters 506 in combination with the auxiliary shifter 511. The products B and C will be respectively shifted 3 bits right and 2 bits right-by the shifters 5061 and 5062. The auxiliary shifter 511 will shift the output from both shifters 5061 and 5062 by 5 bits more to the right so that the mantissas are aligned. The mask generator/cycle counter 508 outputs a cycle # signal that is equal to 1 that may be used to control the auxiliary shifter 511.

Thus, during the second cycle, mask signals $mask_1$ and $mask_2$ are generated having a value of 1 by the mask generator/cycle counter 508 for the products B and C because for both of these products the absolute value of relative exponents e' minus R-$Shift_{max}$ of the local shifters 506 equals a value that is less than or equal to the R-$Shift_{max}$. That is, for the product B, the absolute value equals 8-5=3, which is less than 5 bits. For the product C, the absolute value equals 7-5=2, which is less than 5 bits. The mask signals masks and $mask_2$ are applied to inputs of the AND gates $515_1$ and $515_2$ so that the B and C products are output to the adder tree 502 during the second cycle. Mask signals $m_0$ and $m_3$ are generated by the mask generator 508 as 0s for the products A and D because these products have already been output to the adder tree 502. The mask signals $mask_0$ and $mask_3$ are applied to inputs of AND gates $515_0$ and $515_3$.

The operational example described in FIGS. 5A and 5B completes a dot-product calculation in two cycles. The sequence disclosed herein is based the range of exponent values of the products expected to be processed, the R-$Shift_{max}$ provided by the local shifters 506, and the R-$Shift_{max}$ provided by the auxiliary shifter 511. At one end of a spectrum, the number of shifts provided by the local shifters 506 and the auxiliary shifter 511 may be selected to account for the entire range of exponent values expected to be processed for a given deep-learning data set so that the dot-product calculations may occur in one cycle. At the other end of the spectrum, the R-$Shift_{max}$ provided by the local shifters 506 and by the auxiliary shifter 511 may be selected so that the distribution of the range of exponent values expected to be processed for a given deep-learning data set so that the dot-product calculations occur in a given number of cycles or less. Other cycle configurations may be selected.

It should also be understood that the R-Shift$_{max}$ for the local shifters 506 may be different from the R-Shift$_{max}$ of the auxiliary shifter 511.

Additionally, different groups or clusters of dot-product computation architectures disclosed herein may be formed based on different ranges of exponent values that are expected to be processed so that any stalling between groups or clusters that may occur during multi-cycle processing may be minimized or optimally utilized in an overall design of a CNN accelerator.

Figure 6:
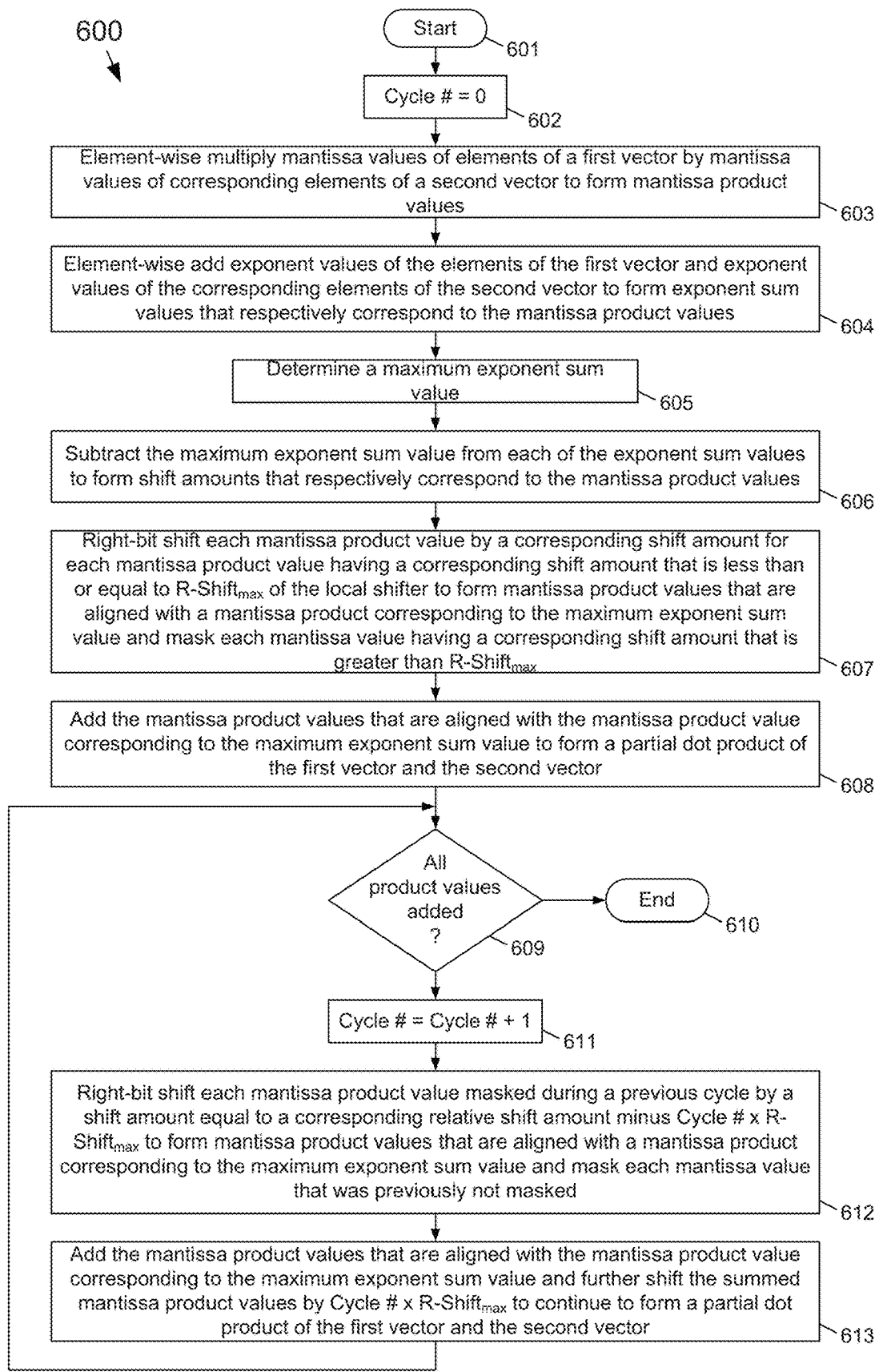
FIG. 6 is a flow diagram of an example method for calculating dot products for deep-learning networks according to the subject matter disclosed herein.

FIG. 6 is a flow diagram of an example method 600 for calculating dot products for deep-learning networks according to the subject matter disclosed herein. Referring to FIGS. 4-6, the method starts at 601 in FIG. 6. At 602, a Cycle # value is set to 0. At 603, the integer logic units 404 of an array of multiplier units 401 element-wise multiply mantissa values of elements of a first vector X by mantissa values of corresponding elements of a second vector W to form mantissa product values. In one embodiment, the first vector X may include n elements of 16-bit floating point values and the second vector W may include n elements of 16-floating point values in which n is an integer greater than 1. The first vector and the second vector may be vectors from a deep-learning data set.

At 604, the exponent logic units 405 of the array of multiplier units 401 element-wise add exponent values of the elements of the first vector X and exponent values of the corresponding elements of the second vector W to form exponent sum values $e_i$ that respectively correspond to the mantissa product values.

At 605, the max tree 407 determines a maximum exponent sum value $e_m$.

At 606, the exponent logic units 405 subtract the maximum exponent sum value $e_m$ from each of the exponent sum values to form relative exponent values $e'_0$ that respectively correspond to the mantissa product values.

At 607, the local shifters 406 of the array of multiplier units 401 right-bit shift the first mantissa product values by a corresponding shift amount m to form mantissa product values that are aligned with a mantissa product corresponding to the maximum exponent sum value. Each local shifter unit 406 may be configured to have a maximum number of bit shifts R-Shift$_{max}$ that is less than a full bit range of the exponent sum values of the first vector and of the second vector. The mantissa product values having a corresponding shift amount $m_i$ that is less than or equal to R-Shift$_{max}$ are left unmasked and the mantissa product values having a corresponding shift amount $m_i$ that is greater than R-Shift$_{max}$ are masked. Additionally, the first mantissa product values corresponding to relative exponent values that are less than or equal to the maximum number of bits shifts of the local shifter unit 406.

At 608, the addition unit 402 adds the mantissa product values that are aligned with the mantissa product value corresponding to the maximum exponent sum value to form a partial dot product of the first vector X and the second vector W. Masked mantissa-product values are not added into the partial dot product at this point. All mantissa product values that have corresponding relative exponent values e' that are less than or equal to the maximum number of bit shifts R-Shift$_{max}$ of the local shifter unit 406 are aligned and added in a first cycle. The mantissa product values that have corresponding relative exponent values e' that are greater than the maximum number of bit shifts R-Shift$_{max}$ of the local shifter unit 406 are further shifted to become aligned and added in subsequent cycles, as follows.

At 609, it is determined whether all mantissa product values have been added and accumulated by the accumulation logic unit 403. If so, the method ends at 610. If not, flow continues to 611 where Cycle # is incremented by 1. At 612, each mantissa product value that was masked in a previous cycle is right-bit shifted by a shift amount $m_i$ that is equal to the relative shift amount e'−(Cycle #×R-Shift$_{max}$). Mantissa product values that have been previously added are masked. Additionally, mantissa product values having relative shift amounts e' that are greater than (current Cycle #+1)×R-Shift) are also masked.

At 613, the addition unit 402 adds the mantissa product values that are currently aligned with the mantissa product value corresponding to the maximum exponent sum value to form a partial dot product of the first vector x and the second vector w. Any masked mantissa product values are not added into the partial dot product. Flow continues to 609 where it is determined whether all mantissa product values have been added and accumulated by the accumulation logic unit 403. If so, the method ends at 610. If not, flow continues to 611.

Figure 7:
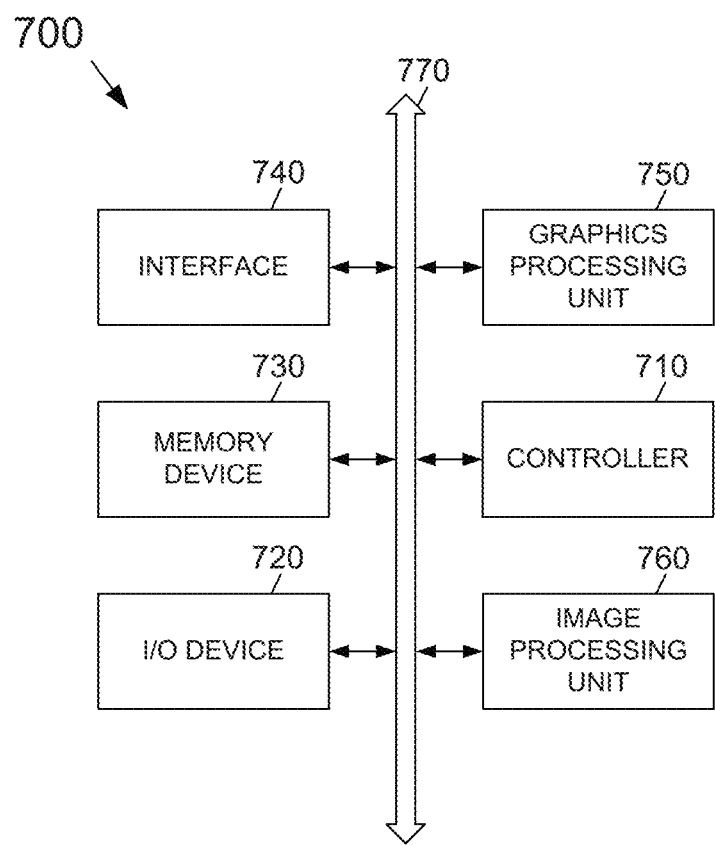
FIG. 7 depicts an electronic device that includes a CNN accelerator that include one or more dot-product computation architectures disclosed herein.

FIG. 7 depicts an electronic device 700 that includes a CNN accelerator that include one or more dot-product computation architectures disclosed herein. The electronic device 700 may also be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 700 may include a controller 710, an input/output device 720 such as, but not limited to, a keypad, a keyboard, a display, a touch-screen display, a camera, and/or an image sensor, a memory 730, an interface 740, a GPU 750, and an imaging-processing unit 760 that are coupled to each other through a bus 770. The controller 710 may include, for example, at least one microprocessor, at least one digital signal processor, at least one microcontroller, or the like. The memory 730 may be configured to store a command code to be used by the controller 710 or a user data. One or both of the GPU 750 and the image-processing unit 760 may include one or more dot-product computation architectures disclosed herein Electronic device 700 and the various system components of electronic device 700 may include the image processing unit 760. The interface 740 may be configured to include a wireless interface that is configured to transmit data to or receive data from a wireless communication network using a RF signal. The wireless interface 740 may include, for example, an antenna. The electronic system 700 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A device for calculating dot-products of a first vector and a second vector, the device comprising:
an array of multiplier units of a processor of the device,
a multiplier unit of the array of multiplier units to:
determine a product-integer value based on integer values of corresponding elements of the first vector and the second vector, the first vector and the second vector comprising floating-point values;
determine an unbiased exponent value corresponding to the product-integer value based on exponent values corresponding to the integer values of the corresponding elements of the two vectors, wherein:
the multiplier unit of the array of multiplier units includes a local shifter that forms a first shifted value by shifting the product-integer value by a number of bits in a predetermined direction based on a difference value between the unbiased exponent value corresponding to the product-integer value and a maximum unbiased exponent value for the array of multiplier units being less than or equal to a predetermined maximum bit-shift capacity of the local shifter, and
the processor determines the maximum unbiased exponent value for the array of multiplier units;
an adder tree that adds first shifted values output from local shifters of the array of multiplier units to form a first output;
an auxiliary shifter coupled to the adder tree and that forms a second shifted value by shifting a second output from the adder tree by the predetermined maximum bit-shift capacity of the local shifter; and
an accumulator that accumulates the first output of the adder tree, wherein the processor provides an inference of a deep neural network model based at least in part on the accumulator accumulating the first output of the adder tree.

2. The device of claim 1, further comprising a mask generator that generates a first mask that couples the first shifted value to the adder tree based on the difference value between the unbiased exponent value corresponding to the product-integer value and the maximum unbiased exponent value being less than or equal to the predetermined maximum bit-shift capacity of the local shifter corresponding to the first shifted value, and wherein the adder tree adds the first shifted values output from the local shifters of the array of multiplier units and that are coupled to the adder tree by the first mask to form the first output.

3. The device of claim 2, wherein the mask generator generates the first mask during a first cycle.

4. The device of claim 2, wherein the mask generator generates a second mask that couples the first shifted value to the adder tree based on the difference value between the unbiased exponent value corresponding to the product-integer value and the maximum unbiased exponent value being greater than the predetermined maximum bit-shift capacity of the local shifter corresponding to the first shifted value, wherein the adder tree adds the first shifted values output from the local shifters of the array of multiplier units and that are coupled to the adder tree by the second mask to form the second output, and wherein the accumulator further accumulates the second output of the adder tree.

5. The device of claim 4, wherein the mask generator generates the second mask during a second cycle.

6. The device of claim 1, wherein the first vector comprises an activation value and the second vector comprises a weight value.

7. The device of claim 6, wherein the activation value and the weight value comprise 16-bit floating-point (FP16) values.

8. The device of claim 6, wherein the activation value and the weight value comprise 32-bit floating-point (FP32) values.

9. A multiplier unit of a processor, wherein:
the processor multiplies integer values of elements of a first vector and corresponding elements of a second vector to form a product-integer value;
the processor adds exponent values corresponding to the integer values of the corresponding elements of the two vectors to form an unbiased exponent value corresponding to the product-integer value;
the multiplier unit includes a local shifter that forms a first shifted value by shifting the product-integer value by a number of bits in a predetermined direction based on a difference value between the unbiased exponent value corresponding to the product-integer value and a predetermined value being less than or equal to a predetermined maximum bit-shift capacity of the local shifter; and
the processor further comprising an auxiliary shifter coupled to an adder tree and that forms a second shifted value by shifting a second output from the adder tree by the predetermined maximum bit-shift capacity of the local shifter, wherein the processor provides an inference of a deep neural network model based at least in part on the auxiliary shifter forming the second shifted value.

10. The multiplier unit of the processor of claim 9, wherein the multiplier unit is part of an array of multiplier units of the processor, the processor to determine the predetermined value, wherein:
the predetermined value includes a maximum unbiased exponent value for the array of multiplier units;
the processor includes the adder tree that adds first shifted values output from local shifters of the array of multiplier units to form a first output; and
the processor includes an accumulator that accumulates the first output of the adder tree.

11. The multiplier unit of the processor of claim 10, further comprising a mask generator that generates a first mask that couples the first shifted value to the adder tree based on the difference value between the unbiased exponent value corresponding to the product-integer value and the maximum unbiased exponent value being less than or equal to the predetermined maximum bit-shift capacity of the local shifter corresponding to the first shifted value, and wherein the adder tree adds the first shifted values output from the local shifters of the array of multiplier units and that are coupled to the adder tree by the first mask to form the first output, and wherein the mask generator generates the first mask during a first cycle.

12. The multiplier unit of the processor of claim 11, wherein the mask generator generates a second mask that couples the first shifted value to the adder tree based on the difference value between the unbiased exponent value corresponding to the product-integer value and the maximum unbiased exponent value being greater than the predetermined maximum bit-shift capacity of the local shifter corresponding to the first shifted value, wherein the mask generator generates the second mask during a second cycle, wherein the adder tree adds the first shifted values output from the local shifters of the array of multiplier units and that are coupled to the adder tree by the second mask to form the second output, and wherein the accumulator further accumulates the second output of the adder tree.

13. The multiplier unit of the processor of claim 9, wherein the first vector comprises an activation value and the second vector comprises a weight value.

14. The multiplier unit of the processor of claim 13, wherein the activation value and the weight value comprise 16-bit floating-point (FP16) values.

15. The multiplier unit of the processor of claim 13, wherein the activation value and the weight value comprise 32-bit floating-point (FP32) values.

16. A method of a processing unit to compute dot-products for floating point values, the method comprising:
element-wise multiplying, by the processing unit associated with an array of multiplier units, integer values of elements of a first vector by integer values of corresponding elements of a second vector to form integer-product values, the first vector comprising n elements of floating point values and the second vector comprising n elements of floating point values in which n is an integer greater than 1;
element-wise adding, by the processing unit, exponent values of the elements of the first vector and exponent values of the corresponding elements of the second vector to form exponent sum values that respectively correspond to the integer-product values;
determining a maximum exponent sum value of the exponent sum values;
subtracting, by the processing unit, the maximum exponent sum value from each of the exponent sum values to form relative exponent values that respectively correspond to the integer-product values;
right-bit shifting, by first local shifters of the array of multiplier units, first integer-product values by a corresponding relative exponent value to form integer-product values that are aligned with an integer-product value corresponding to the maximum exponent sum value, each first local shifter comprising a first predetermined maximum number of bit shifts that is less than a full bit range of exponent sum values of the first vector and of the second vector, and the first integer-product values corresponding to relative exponent values that are less than or equal to the first predetermined maximum number of bit shifts;
right-bit shifting, by an auxiliary shifter, second integer-product values by a second predetermined number of bit shifts to form second integer-product values that are aligned with the integer-product value corresponding to the maximum exponent sum value, wherein the second predetermined number of bit shifts includes the first predetermined maximum number of bits shifts; and
adding the integer-product values that are aligned with the integer-product value corresponding to the maximum exponent sum value to form a dot product of the first vector and the second vector, wherein the processing unit provides an inference of a deep neural network model based at least in part on the processing unit adding the integer-product values that are aligned with the integer-product value corresponding to the maximum exponent sum value.

17. The method of the processing unit of claim 16, wherein the full bit range of exponent sum values of the first vector and of the second vector comprises 58 bits, and wherein the first predetermined maximum number of bit shifts plus the second predetermined number of bits shifts is less than or equal to 58 bits.

18. The method of the processing unit of claim 16, wherein the elements of the first vector and the elements of the second vector comprise 16-bit floating point (FP16) values.

19. The method of the processing unit of claim 16, wherein the elements of the first vector and the elements of the second vector comprise 32-bit floating point (FP32) values.

* * * * *